Dec. 28, 1948.   N. B. STRACHOVSKY   2,457,507
SHAFT COUPLING
Filed Oct. 22, 1943                      2 Sheets-Sheet 2

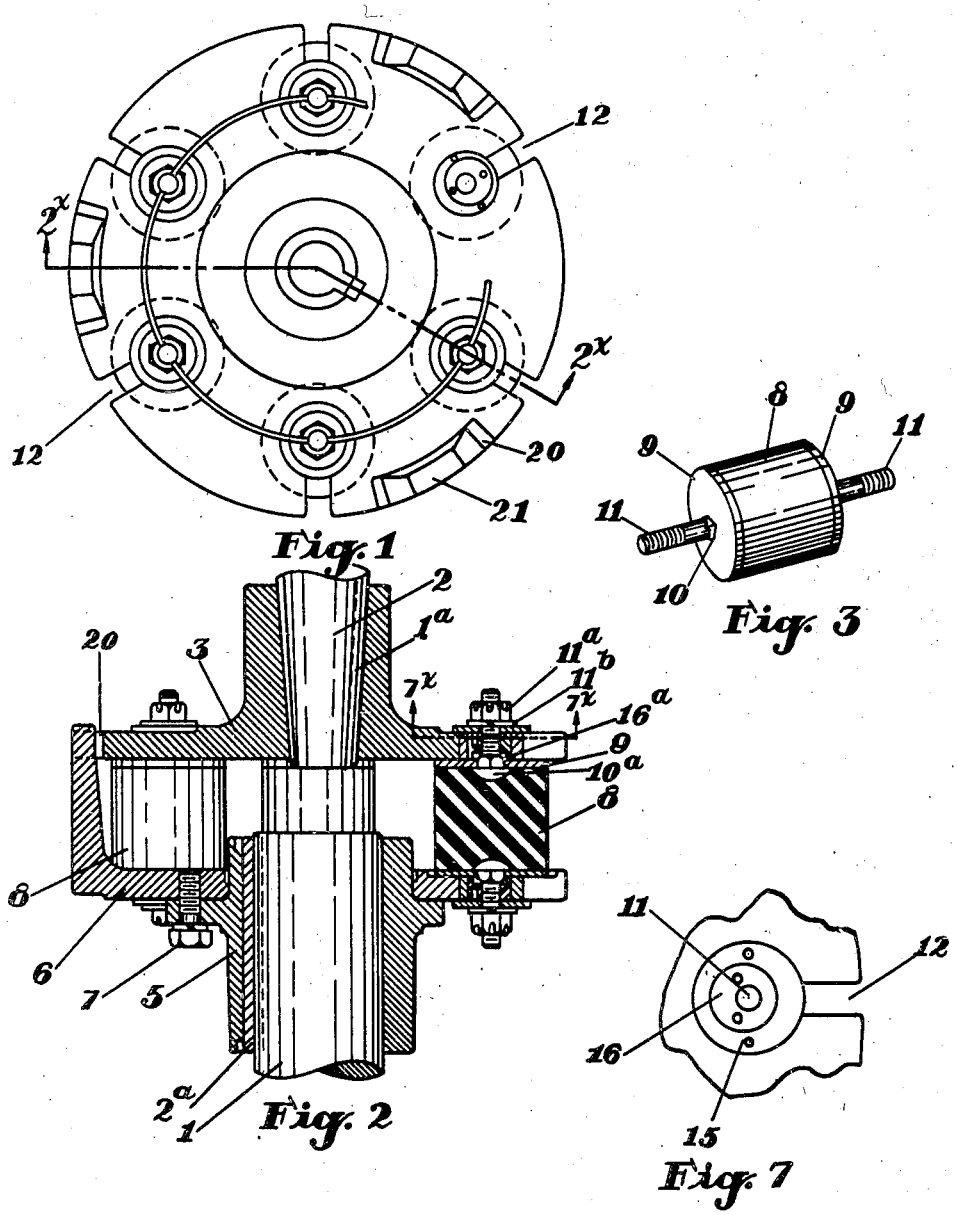

Inventor
NIKITA B. STRACHOVSKY

Patented Dec. 28, 1948

2,457,507

UNITED STATES PATENT OFFICE 2,457,507

SHAFT COUPLING

Nikita Borisowich Strachovsky, Erie, Pa., assignor to Lord Manufacturing Company, Erie, Pa., a corporation of Pennsylvania Application October 22, 1943, Serial No. 507,263

3 Claims. (Cl. 64—11)

My present invention has for its object to furnish an improved form of coupling for connecting the ends of two shafts, one of which comprises a driving shaft, the other the one to which rotary movement is imparted. More particularly the invention relates to a design of coupling in which rubber plays a part in accommodating any misalignment of the shafts and is also used as a means of eliminating, or greatly reducing the tendency to impart vibratory disturbances from one element to the other.

In order to accomplish these functions to their utmost I have discovered that unusual care must be exercised to obtain a thorough dynamic stress balance of the parts or elements of which the coupling is composed in relation to the particular set of conditions to which a given coupling may be subjected.

To this end my invention contemplates an arrangement of parts whereby not only a regular and evenly balanced condition of the mass composing the coupling may be obtained about its center of rotation but also delicate adjustments of the rubber elements may be accomplished to compensate for any lack of homogeneity of the rubber itself from which said elements are constructed. The object of this adjustment is to provide a regular distribution of stresses throughout the mass of the coupling.

To these and other ends my invention consists in further improvements and arrangement of parts, all as will be further described in the accompanying specification and pointed out in the appended claims.

In the drawings:

Fig. 1 is a face view of one side of a coupling constructed in accordance with my invention.

Fig. 2 is a cross sectional view taken on the line $2^x$—$2^x$ of Fig. 1.

Figs. 4 and 5 are views similar to Figs. 1 and 2 illustrating a modification.

Figs. 3 and 6 are perspective views of one of each of the connecting blocks used in the couplings shown in Figs. 1 and 4, respectively.

Fig. 7 is an enlarged detail plan view, partly in cross section taken along the line $7^x$—$7^x$ of Fig. 2, illustrating one of the eccentric adjustments for the ends of the connecting blocks.

Similar reference characters in the several figures indicate similar parts.

Figures 4, 5, 6:
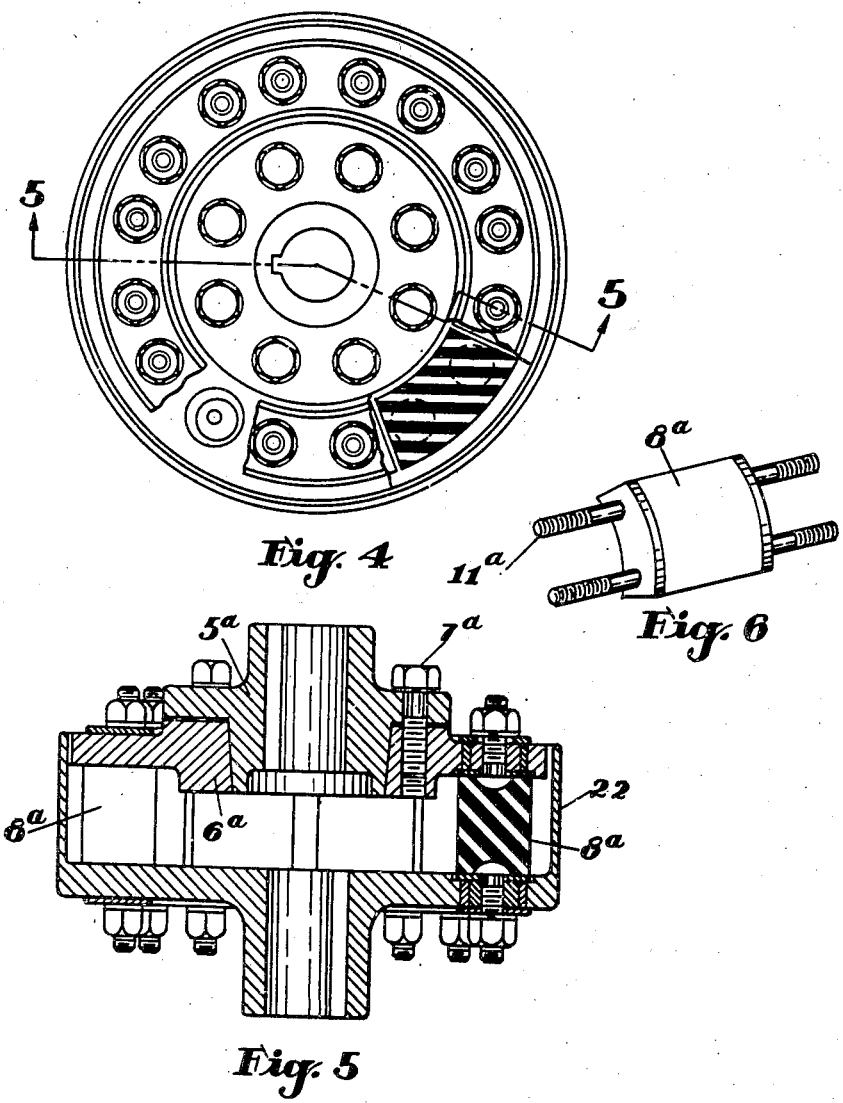

A coupling embodying my invention comprises two face plates connected to the contiguous ends of two shafts 1 and 2, either of which may be a driving member, the other the driven member, to which they are rigidly attached as by keys, or splines $1^a$, $2^a$. The face plates are spaced apart, as shown. One, indicated by 3, comprises a flange integral with its hub, the other, comprises a hub 5 and a separate annulus 6 secured to the hub by bolts 7. The face plates are connected by a plurality of resilient driving members which may vary in number depending upon the diameter of the coupling and the load to be carried. Six of these members are shown in Fig. 1 and as they are similar, a description of one will suffice for all of them.

Each connecting or driving member embodies a cylindrical block or body of rubber 8 bonded or permanently vulcanized at its ends to circular plates 9. These are provided at their centers with hexagonal openings to receive the similarly shaped heads 10 on bolts 11, said heads having overhanging lips or flanges $10^a$ bearing against the inner faces of the plates 9. This arrangement it will be noted secures the bolts firmly in place and prevents them from being rotated with reference to the bodies 8 on the ends of which they form studs for securing them to the two face plates.

The flange 3 and the ring 6 are each provided with radial slots 12 arranged in paired alignment, those of each pair receiving the bolts 11 on the opposite ends of each of the resilient blocks 8 which are firmly secured in position when the nuts $11^a$ are screwed into contact with washers $11^b$ bearing against the outer faces of the flange and ring respectively.

I have discovered that in the production of couplings of this character that by reason of the lack of homogeneity in the rubber from which the blocks or connecting members 8 are made, due either to variations in the rubber composition, or possible slight variations resulting from the vulcanizing process, that by providing for the independent adjustment of the blocks a very accurate dynamic balance in the coupling as a whole may be obtained. This adjustment in most instances only requires a slight movement with reference to the axis of rotation and perhaps not a movement of equal magnitude at the two ends of a given block. Accordingly at the inner ends of the radial slots 12 I provide circular apertures in which are journaled outer bearings or bushings 15. These in turn have eccentrically disposed apertures in which are journaled inner bearings or bushings 16. The latter are provided with eccentrically drilled openings to fit the bolts 11 and at their inner ends have recesses $16^a$ accommodating the bolt heads 10. Both of these eccentric pieces have shallow drill holes in their outer edges to receive the tips of spanner wrenches, as will be understood. By this dual arrangement of inner and outer eccentrics it is possible to achieve a considerable movement of the ends of the blocks 8 with reference to the axis of the coupling without cramping the bolts 11 in their respective slots.

A further feature of my invention resides in a safety connection between the two face plates. This is accomplished by providing three or more notches 20 in the rim 3 and a corresponding number of fingers 21 on the ring 6, which bridge the space between the plates, their extremities lying within the notches. In the event of an overload on the coupling, or if for any reason the blocks 8 become broken or their fastenings loosened, sides of the fingers 21 will engage the ends of the notches 20 and continue the driving action of one part to the other.

The modified structure illustrated in Figs. 4, 5, and 6 is important for use especially where space limits or influences the size of the coupling, or for other reasons it is desired to use the maximum amount of rubber within a given circumference. In this embodiment of the invention I make the rubber blocks 8a arcuate in form, each of a sufficient length to accommodate two clamping bolts 11a at their opposite ends. While the latter may be inserted in operative position by slotting the peripheral edges of the face plates 3a and annulus 6a, as before described, said slots may be omitted. In such an instance the assembly of the two parts of the coupling may for convenience be accomplished by connecting the blocks 8a to the face plate and annulus and subsequently attaching the annulus to its hub 5a by the bolts 7a, when the connection between the two shaft ends is to be finally accomplished.

In this modification I have omitted the safety connection between the coupling members which may not be needed especially at certain speeds of rotation, and in place thereof I have illustrated a drum or ring 22 which gives the coupling a smooth exterior and may also serve as a brake drum.

A distinct advantage is obtained by the use of a plurality of blocks, be they cylindrical or arcuate over using a continuous rubber ring because in the first place, it is possible to make them initially more uniform in composition and resultant action than could be expected from equivalent sections of a solid ring. Secondly, knowing that differences exist in the homogeneity in rubber bodies subjected to any curing or vulcanizing processes it is admittedly necessary, where these form components of a rotating body, to utilize my invention as a means of reducing incipient vibrations resulting from the coupling of two shafts where flexibility between them is considered of any importance.

I claim as my invention:

1. In a coupling comprising two substantially parallel face plates spaced apart, constituting driving and driven members, said members being provided with aligned apertures, the combination with a plurality of elastic members disposed between said plates having securing studs projecting through the plate apertures and each exerting a force on said plates dependent upon the misalignment of the members, of eccentric bearings journaled in the apertures and carrying said studs for adjusting the elastic members inwardly or outwardly with reference to the axis of the face plates to balance the forces exerted on said plates.

2. In a coupling, the combination with one face plate which may be a driving member, a second face plate which may be a driven member, said plates being provided with registering apertures, of blocks of elastic material arranged between the face plates each having attaching studs projecting through the apertures and each exerting a force on said plates dependent upon the misalignment of the members, an inner eccentric ring carrying each stud and outer eccentric rings journaled in the plate apertures and carrying said inner rings whereby the forces exerted on said plates may be balanced.

3. In a flexible coupling, axially spaced driving and driven members, a plurality of axially extending parts of elastic material radially spaced around the axis of the coupling connecting said members and exerting forces thereon dependent upon the misalignment of the members, means for adjusting the relative radial spacing of the parts to balance the reaction on said members of the forces due to the individual parts, and means for holding the parts in adjusted position.

NIKITA BORISOWICH STRACHOVSKY.

REFERENCES CITED

The following references are of record in the file of this patent:

UNITED STATES PATENTS

| Number | Name | Date |
|---|---|---|
| 829,251 | Booraem | Aug. 21, 1906 |
| 1,565,264 | Dubi | Dec. 15, 1925 |
| 1,571,557 | Paul | Feb. 2, 1926 |
| 1,656,715 | Weiland | Jan. 17, 1928 |
| 2,172,707 | Julien | Sept. 12, 1939 |

FOREIGN PATENTS

| Number | Country | Date |
|---|---|---|
| 660,305 | Germany | May 23, 1938 |